United States Patent
Akikuni et al.

(10) Patent No.: US 6,693,714 B1
(45) Date of Patent: Feb. 17, 2004

(54) POSITION SENSOR FOR MOVABLE BODY AND OPTICAL INTERFEROMETER

(75) Inventors: Fumio Akikuni, Tokyo (JP); Akio Ichikawa, Tokyo (JP); Eiichi Sano, Tokyo (JP)

(73) Assignees: Ando Electric Co., Ltd., Tokyo (JP); FK Optical Laboratory Co., Tokyo (JP)

( * ) Notice: Subject to any disclaimer, the term of this patent is extended or adjusted under 35 U.S.C. 154(b) by 0 days.

(21) Appl. No.: 09/535,527

(22) Filed: Mar. 27, 2000

(30) Foreign Application Priority Data

Mar. 29, 1999 (JP) .......................................... 11-086737

(51) Int. Cl.[7] .................................................. G01B 9/02
(52) U.S. Cl. ...................................................... 356/498
(58) Field of Search .............................. 356/452, 455, 356/498

(56) References Cited

U.S. PATENT DOCUMENTS 4,165,183 A * 8/1979 Hall et al. .................. 356/455

FOREIGN PATENT DOCUMENTS

| EP | 0 447 713 | 9/1991 |
| EP | 0 982 564 A1 | 3/2000 |
| WO | WO 94/24516 | 10/1994 |

* cited by examiner

*Primary Examiner*—Samuel A. Turner
*Assistant Examiner*—Patrick Connolly
(74) *Attorney, Agent, or Firm*—Oliff & Berridge, PLC

(57) ABSTRACT

A position sensor for movable body, which detects a position of a movable body which moves in a reciprocal direction, comprises; at least two portions to be detected, which are provided on one side surface of the movable body with respect to a moving direction of the movable body, and at least two detectors for detecting the portions to be detected, wherein one portion to be detected is not arranged on a line parallel to the moving direction, on which the other portion is disposed, nor arranged on a line perpendicular to the moving direction, on which the other portion is disposed, one detector corresponding to the one portion is arranged so that when the one detector detects the one portion by moving the movable body in one direction, the other portion is moved in the one direction beyond the one detector, and the other detector corresponding to the other portion is arranged so that when the other detector detects the other portion by moving the movable body in the other direction, the one portion is moved in the other direction beyond the other detector.

5 Claims, 4 Drawing Sheets

POSITION SENSOR FOR MOVABLE BODY AND OPTICAL INTERFEROMETER

BACKGROUND OF THE INVENTION

1. Field of the Invention

The present invention relates to a position sensor for a movable body, for example, a position sensor which is useful for an optical interferometer used in an optical measurement technical field, and an optical interferometer to which the position sensor is applied.

2. Description of the Related Art

In optical interferometers which the Michelson interferometer represents, an incident light is divided into two optical paths for a transmitted light and a reflected light, which are perpendicular to each other, by using a beam splitter. Two lights reflected on each mirror disposed so as to be perpendicular to each optical path are multiplexed by a beam splitter again.

At the same time, a stage on which one mirror is mounted is moved at a constant speed and straightly. The optical path difference between the two lights reflected on the two mirrors is caused. A variety of intensity of interference fringes can be observed. The variety of intensity of interference fringes is fetched by the photo-detector as an electric signal.

The wavelength of a light can be measured more precisely by moving the movable mirror straight and a long distance.

In order to detect the limitation on a movement of the movable mirror, that is, in order to detect a position corresponding to the limitation on a movement of the stage, according to an earlier development, a pair of limit switches is disposed in a casing on one side of a line on which the stage is moved. Each position corresponding to the limitation is detected in each direction with a pair of limit switches by using one dog provided on the stage.

However, in a position sensor according to an earlier development, because of the relation between one dog and a pair of limit switches disposed at both ends of a movable range for the stage, each amount of movement of the stage in each direction, which is defined on the basis of the neutral position of the stage is small. Therefore, the movable distance of the stage cannot be sufficiently obtained.

That is, because the position of one dog provided on the stage is detected with a pair of limit switches, each amount of movement in each direction is only a distance from one dog of the stage in the neutral position to the limit switch. Therefore, it is not possible that both the movable distance of the movable mirror is obtained sufficiently, and that the casing becomes small.

SUMMARY OF THE INVENTION

In order to solve the above-described problems, an object of the present invention is to provide a position sensor in which the movable distance of a movable body can be reasonably obtained and in which a casing for containing the movable body can be sufficiently small.

Another object of the present invention is to provide an optical interferometer in which the above position sensor is provided.

That is, in accordance with one aspect of the present invention, the position sensor for the movable body, which detects a position of the movable body which moves in a reciprocal direction, comprises;

a plurality of portions to be detected, which are provided on one side surface of the movable body with respect to a moving direction of the movable body, and which are arranged in different positions from each other in a direction along the moving direction of the movable body and in a direction crossing the moving direction, and a plurality of detectors which are arranged so that each detector corresponds to each portion to be detected.

As a movable body, a movable mirror for an optical interferometer, which moves straightly is used. However, the present invention is not limited to this. The movable body may be one which moves along a curved line.

As a portion to be detected, a dog which projects from the movable body is used. However, the present invention is not limited to this. Any portion to be detected may be used.

As a detector, a photoelectric type of detector is used. However, the detector may be a magnetic type of detector, an electronic type of detector or a mechanical type of detector.

According to the present invention, the position sensor comprises a plurality of portions to be detected. The plurality of portions to be detected are provided on one side surface of the movable body. The plurality of portions to be detected move in a reciprocal direction, with respect to a moving direction of the movable body. The plurality of portions to be detected are arranged in different positions from each other in a direction along the moving direction of the movable body and in a direction crossing the moving direction. The position sensor further comprises a plurality of detectors which are arranged so that each detector corresponds to each portion to be detected. The movable body can be moved a long distance, for example, from each portion to be detected, of the movable body in a neutral position to each corresponding detector. The amount of movement of the movable body can be detected, by detecting the plurality of portions to be detected. The plurality of portions to be detected are provided on one side surface of the movable body in different positions from each other in a direction along the moving direction and in a direction crossing the moving direction, with the corresponding detectors.

Therefore, the movable distance of the movable body can be obtained reasonably. Because a plurality of portions to be detected and a plurality of detectors are arranged on one side of the movable body with respect to the moving direction of the movable body, a casing for containing the movable body can be small.

The plurality of portions to be detected may be a pair of dogs projecting from the movable body, and the plurality of detectors may be a pair of photoelectric type of detectors.

According to the present invention, because the portions to be detected are a pair of dogs projecting from the movable body and the detectors are a pair of photoelectric type of detectors, the amount of movement of the movable body in a reciprocal direction can be detected by a photoelectric sensing method in which the dogs are not in contact with the detectors.

In accordance with another aspect of the present invention, the optical interferometer in which a reference light and a light to be measured interfere with each other by a plurality of optical parts, is one wherein the plurality of optical parts are separated into a fixed optical part and a movable optical part. The fixed optical part is fixed to a casing and a movable optical part is movable with respect to the casing. The optical interferometer comprises a position sensor for the movable optical part, which detects a position of a movable optical part which moves in a reciprocal direction.

The optical interferometer further comprises a plurality of portions to be detected, which are provided on one side surface of the movable optical part with respect to a moving direction of the movable optical part. The plurality of portions to be detected are arranged in different positions from each other in a direction along the moving direction of the movable optical part and in a direction crossing the moving direction. The optical interferometer further comprises a plurality of detectors which are arranged so that each detector corresponds to each portion to be detected. For example, as an optical part, a beam splitter or a reflector is used.

According to the present invention, because the movable optical part is disposed on an optical axis which is approximately parallel to an optical axis of the reference light, the wavelength of a light can be measured more precisely by moving the movable optical part a long distance along an optical axis which is approximately parallel to the optical axis of the reference light. Further, the casing can be sufficiently small.

Because the position of the movable optical part is detected by using the above position sensor, the movable distance of the movable optical part can be obtained reasonably. The casing can be small.

In accordance with another aspect of the present invention, the optical interferometer has a reference light and a light to be measured. The reference light and light to be measured branch into two optical paths for a transmitted light and a reflected light, which are perpendicular to each other, by a beam splitter. After the reflected light and the transmitted light are reflected on a plurality of reflecting members each other in each optical path, the reflected light and the transmitted light are multiplexed by the beam splitter to receive the multiplexed light by a photo-detector. The optical interferometer has the plurality of reflecting members which are separated into a fixed reflecting member which is fixed to a casing and a movable reflecting member which is movable with respect to the casing.

The optical interferometer comprises a position sensor for the movable reflecting member, which detects a position of a movable reflecting member which moves in a reciprocal direction. The position sensor has a plurality of portions to be detected, which are provided on one side surface of the movable reflecting member with respect to a moving direction of the movable reflecting member, and which are arranged in different positions from each other in a direction along the moving direction of the movable reflecting member and in a direction crossing the moving direction. The position sensor further has a plurality of detectors which are arranged so that each detector corresponds to each portion to be detected.

For example, a representative reflecting member is a mirror. Instead of a mirror, for example, a corner cube or a reflector may be used.

The photo-detector is one for fetching a variety of intensity of interference fringes as an electric signal.

According to the present invention, because the movable reflecting member is disposed on an optical axis which is approximately parallel to an optical axis of the reference light, the wavelength of a light can be measured more precisely by moving the movable reflecting member a long distance along an optical axis which is approximately parallel to the optical axis of the reference light. Further, the casing can be sufficiently small.

Because the position of the movable reflecting member is detected by using the above position sensor, the movable distance of the movable reflecting member can be obtained reasonably. The casing can be small.

A pair of fixed reflecting members for reflecting the reflected light and the transmitted light toward the other fixed reflecting member each other may be provided, and a pair of movable reflecting members for totally reflecting a light toward each fixed reflecting member may be disposed between the pair of fixed reflecting members.

According to the present invention, because a pair of movable reflecting members for totally reflecting a light toward each fixed reflecting member is disposed between the pair of fixed reflecting members for reflecting the reflected light and the transmitted light toward the other fixed reflecting member each other, a wide range in which an optical path difference between two lights is caused can be obtained by moving the pair of movable reflecting members between the pair of fixed reflecting members on an optical axis which is approximately parallel to the optical axis of the reference light so as to reflect each light totally.

In accordance with another aspect of the present invention, the position sensor for movable body, which detects a position of a movable body which moves in a reciprocal direction, comprises at least two portions to be detected and at least two detectors for detecting the portions to be detected. The at least two portions to be detected, which are provided on one side surface of the movable body with respect to a moving direction of the movable body. The at least two detectors for detecting the portions to be detected comprise one portion to be detected that is not arranged on a line parallel to the moving direction, on which the other portion is disposed, nor arranged on a line perpendicular to the moving direction, on which the other portion is disposed. The at least two detectors for detecting the portions to be detected further comprise one detector corresponding to the one portion that is arranged so that when the one detector detects the one portion by moving the movable body in one direction, the other portion is moved in the one direction beyond the one detector. The at least two detectors further comprise an other detector corresponding to the other portion that is arranged so that when the other detector detects the other portion by moving the movable body in the other direction, the one portion is moved in the other direction beyond the other detector.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention.

FIGS. 6A and 6B are views showing a state in which the position sensor detects a position corresponding to the limitation on a movement of the movable reflecting member shown in FIG. 5, and are side views which are similar to FIG. 5, wherein FIG. 6A is a view showing a state in which the movable reflecting member is moved to the left side and FIG. 6B is a view showing a state in which the movable reflecting member is moved to the right side.

DETAILED DESCRIPTION OF PREFERRED EMBODIMENTS

Hereinafter, an embodiment of the position sensor and that of the optical interferometer according to the present invention will be explained in detail with reference to FIGS. 1 to 5, 6A and 6B.

Figure 1:
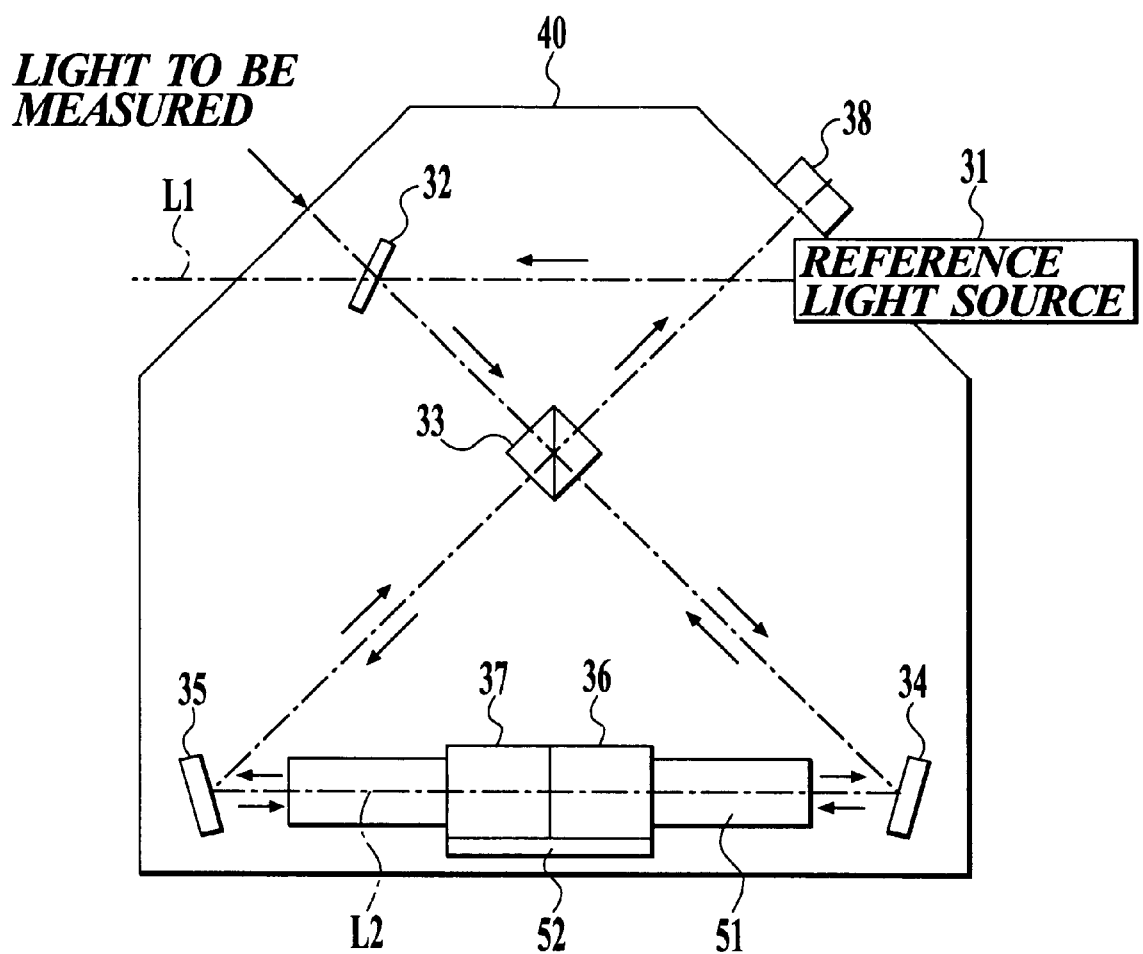
FIG. 1 is a plan view showing an example of a schematic construction of a small-sized optical interferometer as an example to which the present invention is applied.

FIG. 1 is a plan view showing an example of a schematic construction of a small-sized optical interferometer as an example to which the present invention is applied. In this figure, reference numeral L1 denotes a reference optical axis, L2 denotes a movable optical axis, 31 denotes a reference light source, 32 denotes a first mirror, 33 denotes a beam splitter, 34 denotes a second mirror, 35 denotes a third mirror, 36 and 37 denote movable mirrors (corner cubes), 38 denotes a photo-detector, 40 denotes a casing, 51 denotes a linear guide, and 52 denotes a mirror base.

In the small-sized optical interferometer, an He-Ne laser is used as a reference light source 31.

As shown in FIG. 1, a reference light (an He-Ne laser light) outgoing from the reference light source 31 passes along the reference optical axis L1 and is reflected on the first mirror 32 inside the casing 40. The reflected light is incident on the beam splitter 33. Further, a light to be measured, which outgoes from the outside of the casing 40 is incident on the beam splitter 33. The light to be measured and the reference light pass along different optical paths which are on an upper stage and on a lower stage respectively. The two lights are incident on the beam splitter 33.

By the beam splitter 33, the incident light is divided into two optical paths for a transmitted light and a reflected light, which are perpendicular to each other. The transmitted light is reflected on the second mirror 34 toward the third mirror 35. The reflected light is reflected on the third mirror 35 toward the second mirror 34.

The light reflected on the second mirror 34 is totally reflected on the movable mirror 36 which is one corner cube. The light reflected on the third mirror 35 is totally reflected on the movable mirror 37 which is the other corner cube.

The movable mirrors 36 and 37 have a construction in which the mirrors 36 and 37 are movable on the linear guide 51 along the optical axis between the second mirror 34 and the third mirror 35.

The light which is totally reflected on one movable mirror 36 is reflected on the second mirror 34 and is incident on the beam splitter 33 again. The light which is totally reflected on the other movable mirror 37 is reflected on the third mirror 35 and is incident on the beam splitter 33 again.

The reference light and the light to be measured are multiplexed by the beam splitter 33. At the same time, by moving a pair of movable mirrors 36 and 37 which are corner cubes on the linear guide 51 along the optical axis at a constant speed, the optical path difference between the reflected lights which are reflected on two movable mirrors 36 and 37 is caused. A variety of intensity of interference fringes can be observed.

The variety of intensity of interference fringes is fetched by the photo-detector 38 as an electric signal.

The optical axis of the reflected lights which are reflected on two movable mirrors 36 and 37 is referred to as a movable optical axis L2.

As described below, in case of an optical system in which two movable mirrors 36 and 37 are removed, the optical paths are as follows.

Figure 2:
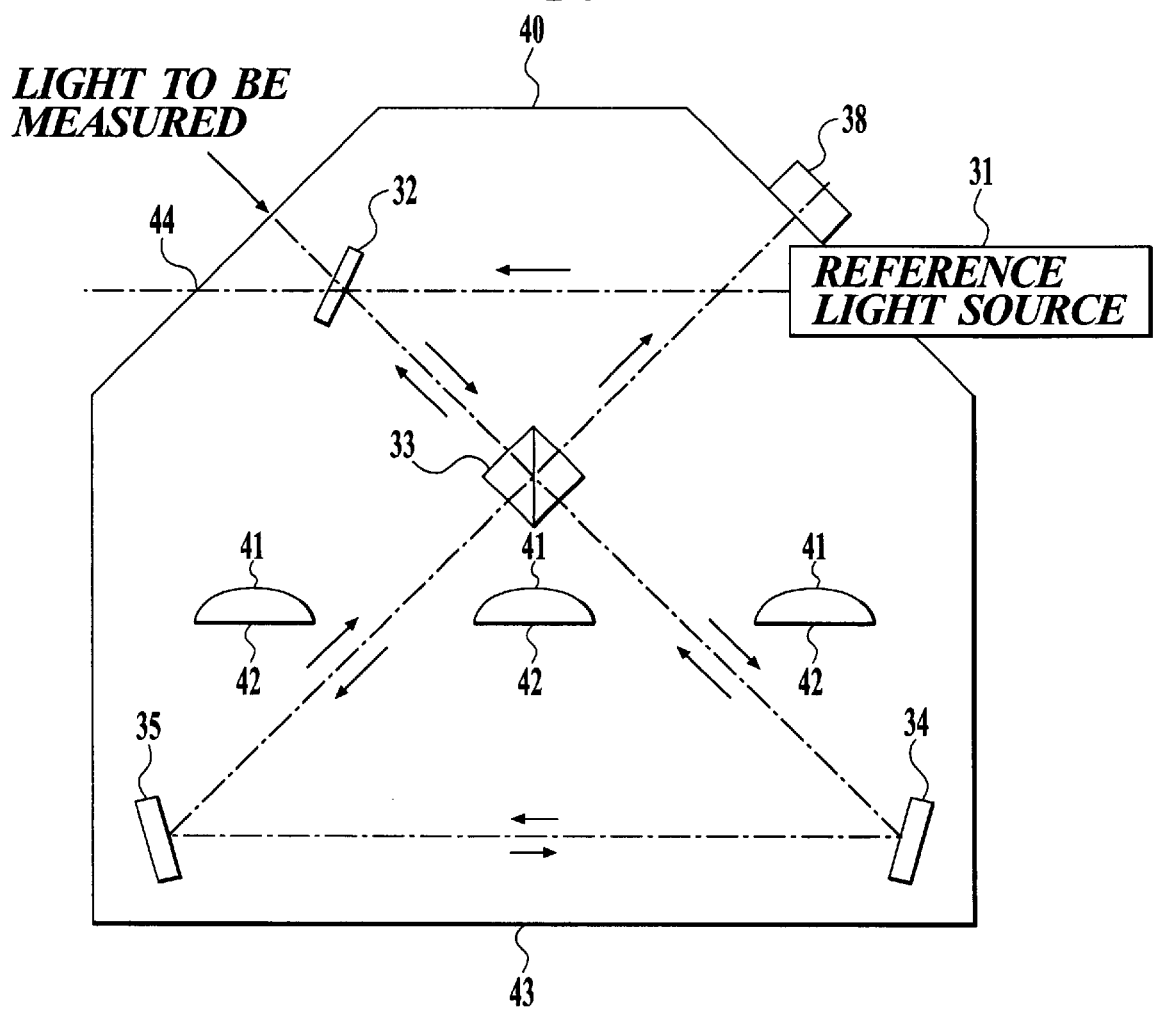
FIG. 2 is a plan view showing fixed optical parts which are disposed in a casing according to the small-sized optical interferometer shown in FIG. 1.

That is, as shown in FIG. 2, the transmitted light divided by the beam splitter 33 is reflected on the second mirror 34 toward the third mirror 35. The light reflected on the second mirror 34 is reflected on the third mirror 35 and is incident on the beam splitter 33 again.

The reflected light divided by the beam splitter 33 is reflected on the third mirror 35 toward the second mirror 34. The light reflected on the third mirror 35 is reflected on the second mirror 34 and is incident on the beam splitter 33 again.

After the reference light and the light to be measured are multiplexed by the beam splitter 33, the interference between two lights is caused. The interference is fetched by the photo-detector 38 as an electric signal.

In the above small-sized optical interferometer, as shown in FIG. 2, a plurality of bosses 41, 41, and 41 (in the figure, the number of the bosses is 3) are provided in the casing 40. The first reference surfaces 42, 42 and 42 are formed on these bosses 41, 41 and 41so that these surfaces are on the same plane. Further, the second reference surface 43 is formed on the external form portion of the casing 40.

The first reference surfaces 42, 42 and 42 and the second reference surface 43 are parallel with each other. The first reference surfaces 42, 42 and 42 face to the second reference surface 43 and are obtained by carrying out a high precise process for a flat surface.

Figure 3:
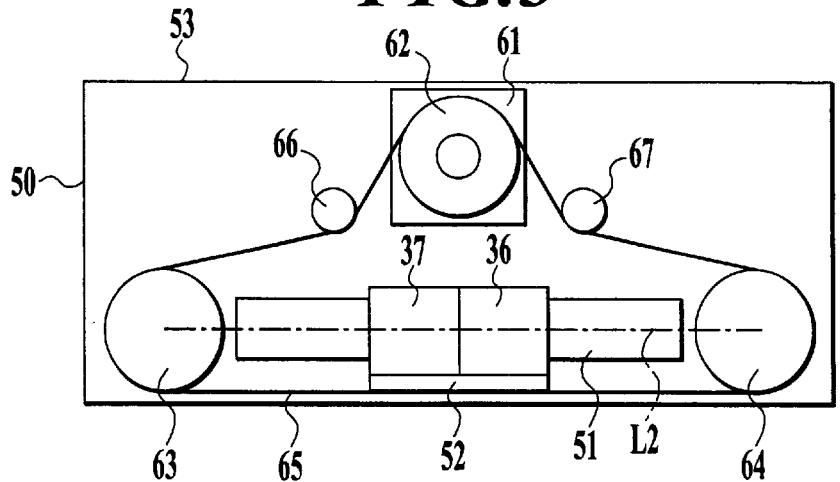
FIG. 3 is a plan view showing a state in which movable optical parts and a driving system thereof are removed with a block according to the small-sized optical interferometer shown in FIG. 1.

FIG. 3 is a plan view showing a state in which the movable mirrors 36 and 37 and the driving system thereof are removed with a block 50. In the figure, the reference numeral 53 denotes a reference surface, 61 denotes a motor (a stopping motor), 62 denotes a driving pulley (a timing pulley), 63 and 64 denote driven pulleys (timing pulleys), 65 denotes a belt (a timing belt), and 66 and 67 denote tension pulleys.

That is, as shown in FIG. 3, the linear guide 51 is provided on the block 50 unitedly or in one united body. The central motor 61, the driving pulley 62, the left driven pulley 63, the right driven pulley 64 and the tension pulleys 66 and 67 are provided on the block 50.

The belt 65 is attached to the driving pulley 62 provided on the output shaft of the motor 61, and to the driven pulleys 63 and 64 which are provided on both sides of the linear guide 51. The belt 65 is fixed to the mirror base 52 in which two movable mirrors 36 and 37 are provided.

The tension pulleys 66 and 67 for tensing the belt 65 are suitably are disposed on both sides of the driving pulley 62.

The end face of the block 50, to which the motor 61 is closely provided close is a reference surface 53 corresponding to the first reference surfaces 42, 42 and 42 of the casing 40. The reference surface 53 is obtained by carrying out a high precise process for a flat surface.

The linear guide 51 (the movable optical axis L2) is provided on the block 50 so as to be parallel with the reference surface 53. The block 50 is fixed to the casing 40 with screws so that the reference surface 53 is in contact with the first reference surfaces 42, 42 and 42.

Next, the method for using the above small-sized optical interferometer will be explained.

When the block 50 is not attached to the casing 40, two movable mirrors 36 and 37 which are corner cubes do not exist on the movable optical axis L2. As shown in FIG. 2, the reference light outgoes far from the a reference optical axis through hole 44 toward the outside of the casing 40. Thereby, the accuracy of the parallel between the reference optical axis L1 of the reference light which outgoes soon from the reference light source 31 and both the first reference surface 42 of the casing 40 and the second reference surface 43 thereof can be adjusted more precisely.

When the optical axis (referred to the movable optical axis L2) which is generated by the second mirror 34 and the third mirror 35 is adjusted so as to be parallel with the second reference surface 43 of the casing 40, as described above, the interference between the reference light and the light to be measured can be caused only by fitting the movable optical axis L2 generated by the movable mirrors 36 and 37 on the block 50, which are previously adjusted at the outside of the casing 40, to the optical axis generated by the second mirror 34 and the third mirror 35.

The movable mirrors 36 and 37 can be adjusted mechanically and optically by removing the whole block 50 from the casing 40. In the concrete, the movable mirrors 36 and 37 which are corner cubes can be adjusted by a collimator and a laser on the basis of the reference surface 53 of the block 50.

Because the block 50 can be removed from the casing 40, the linear guide 51, the mirror base 52, the motor 61, the pulleys 62, 63 and 64, the belt 65 and the like, which are consumable parts can be exchanged easily.

As described above, by removing the movable optical parts as a block 50 from the casing 40, the fixed optical parts and the movable optical part can be separately adjusted mechanically and optically. That is, by removing the movable mirrors 36 and 37 (the movable reflectors) and the driving system thereof (the motor 61, the pulleys 62, 63 and 64, the belt 65 and the like) with the block 50 from the casing 40, the beam splitter 33 and the fixed reflectors (the mirrors 32, 34 and 35) can be adjusted mechanically and optically so that the movable mirrors 36 and 37 are adjusted separately from them.

Therefore, the maintenance of the movable mirrors 36 and 37 can be improved. Because the beam splitter 33 and the mirrors 32, 34 and 35 which are inside the casing 40 can be adjusted optically by removing the movable mirrors 36 and 37 with the block 50 from the casing 40, the accuracy of the ratio of the optical interference can be improved. Further, the casing 40 can be efficiently small.

The movable mirrors 36 and 37 can be moved a long distance along the movable optical axis L2 which is parallel with the reference optical axis L1. As a result, the wavelength of a light can be measured more precisely. Further, the casing 40 can be efficiently small.

Because each light is totally reflected on a pair of movable mirrors 36 and 37, which is moved on the movable optical axis L2, which is parallel with the reference optical axis L1 between a pair of the fixed mirrors 34 and 35, it is possible to obtain a wide range in which an optical path difference between two lights is caused.

Figure 4:
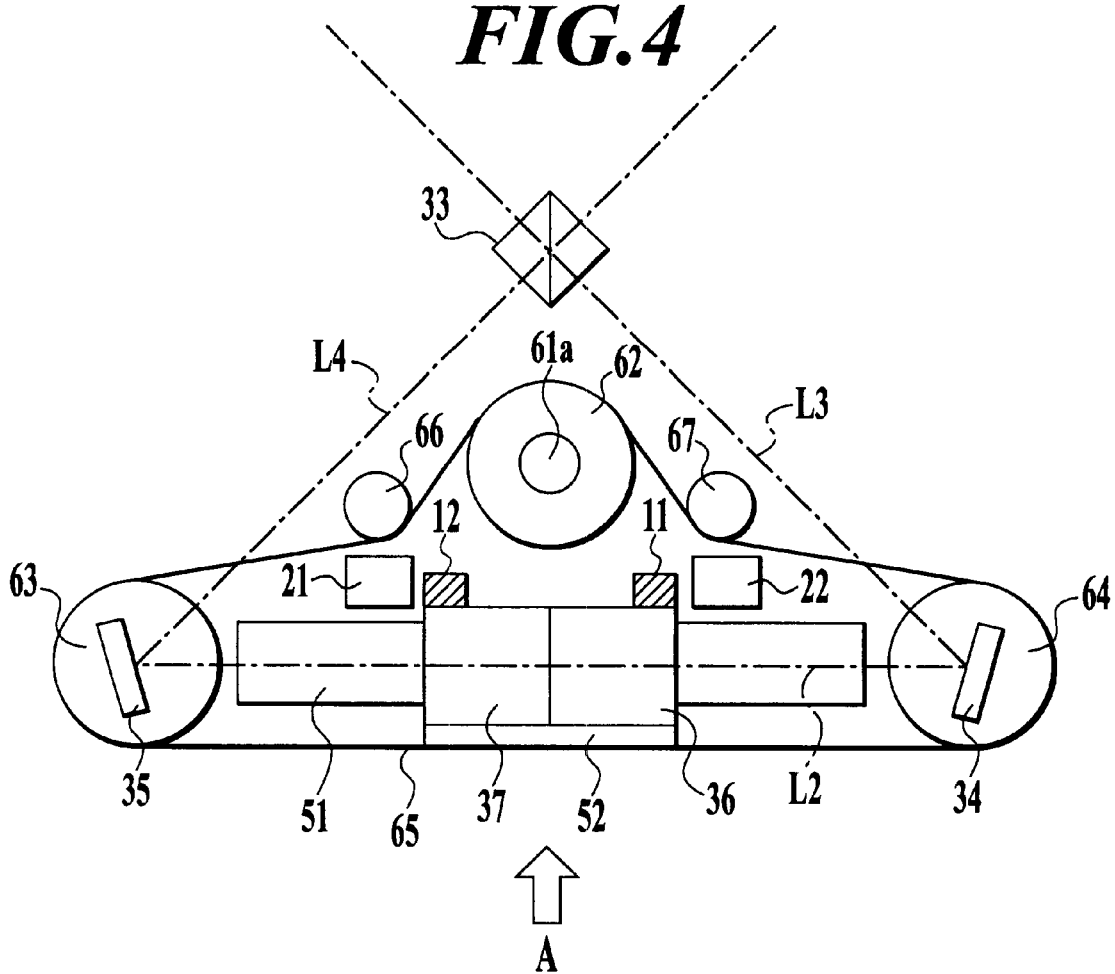
FIG. 4 is a schematic plan view showing the movable optical parts and a driving system thereof shown in FIG. 3 and showing a relation between the fixed optical parts arranged on both sides of the movable optical parts and the beam splitter shown in FIGS. 1 and 2.

In detail, as shown in FIG. 4, the motor 61 (which is a driving source of the belt 65 which is a driving member of the movable mirrors 36 and 37) and the output shaft 61a of the motor 61 are positioned at the approximate center of a triangle formed by the movable optical axis L2, the optical axis L3 between the beam splitter 33 and the second mirror 34, and the optical axis L4 between the beam splitter 33 and the third mirror 35.

The motor 61 and the output axis 61a of the motor 61 are positioned at the approximate middle point between the second mirror 34 and the third mirror 35.

Therefore, a pair of movable mirrors 36 and 37 can be moved at the same initial speed in both right and left directions by driving the motor 61 via the output shaft 61a, the driving pulley 62 and the belt 65.

Because the motor 61 is close to both right and left driven pulleys 63 and 64, the initial speed of the movable mirrors 36 and 37 can be high to the utmost in both right and left directions by using the belt 65. The measurement of time can be shortened.

Figure 5:
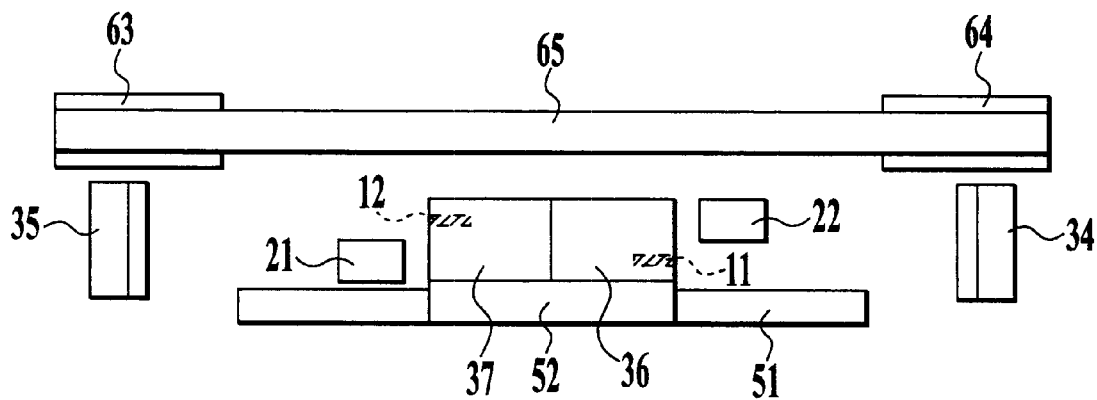
FIG. 5 is a side view of FIG. 4, which is viewed in a direction of the arrow A shown in FIG. 4.

As shown in FIG. 5, the linear guide 51 is disposed on the bottom of the casing 40 by reason of an accuracy of the measurement. Further, the output shaft 61a is directed to the upper position of the motor 61. The driving pulley 62, the driven pulleys 63 and 64 and the belt 65 are disposed in the upper position of the linear guide 51.

Because the space between the linear guide 51 and the belt 65 is obtained, the small-sized optical interferometer has a reasonable arrangement in which the optical paths for the reference light and the light to be measured can be obtained.

Therefore, for this reason, the casing 40 can be small.

The arrangement of the linear guide 51 and that of the driving pulley 62, the driven pulleys 63 and 64 and the belt 65 may be reversed in upper and lower positions.

As a position sensor for detecting the limitation on a movement of a pair of movable mirrors 36 and 37, as shown in FIGS. 4 and 5, a pair of portions (dogs) 11 and 12 to be detected is provided on a pair of movable mirrors 36 and 37. Further, a pair of detectors (interrupters) 21 and 22 is provided on the block 50.

That is, as shown in FIG. 4, the dogs 11 and 12 are provided projectingly and unitedly on the beam splitter 33 side of the movable mirror 36 and 37 which is united back to back. As shown in FIG. 5, the dog 11 provided on the right movable mirror 36 is positioned on the linear guide 51 side. The dog 12 provided on the left movable mirror 37 is positioned on the belt 65 side.

The interrupter 21 corresponding to the dog 11 provided on the right movable mirror 36 is disposed near the left tension pulley 66. The interrupter 22 corresponding to the dog 12 provided on the left movable mirror 37 is disposed near the right tension pulley 67. Such right and left interrupters 21 and 22 are attached to the block 50.

Figure 6A:
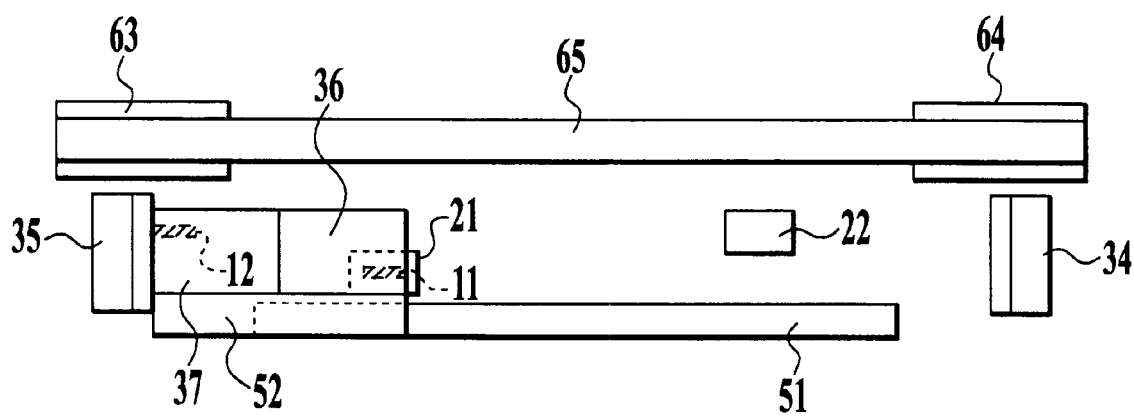
Figure 6B:
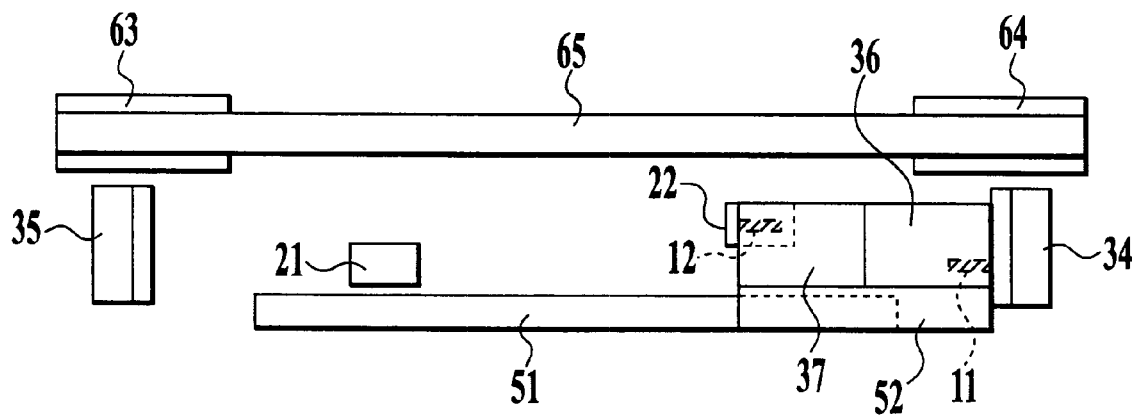

Because a position sensor comprises the dogs 11 and 12 and the interrupters 21 and 22 which are arranged as described above, the movable mirrors 36 and 37 can be moved a long distance in right and left directions as shown in FIGS. 6A and 6B.

That is, in case of movement in a left direction, as shown in FIG. 6A, the movable mirrors 36 and 37 are moved in a left direction along the linear guide 51 by driving the belt 65 driven with the motor 61. When the dog 11 provided on the right movable mirror 36 is detected by the left interrupter 21, the movable mirrors 36 and 37 are stopped. This is a position corresponding to the limitation on a movement of the movable mirrors 36 and 37 in a left direction.

In case of movement in a right direction, as shown in FIG. 6B, the movable mirrors 36 and 37 are moved in a right direction along the linear guide 51. When the dog 12 provided on the left movable mirror 37 is detected by the left interrupter 22, the movable mirrors 36 and 37 are stopped. This is a position corresponding to the limitation on a movement of the movable mirrors 36 and 37 in a right direction.

As described above, the dogs 11 and 12 are provided at each outside end of the side surface of each movable mirror 36 and 37, which is on the beam splitter 33 side, so as to be arranged in positions which are different from each other in a direction perpendicular to the linear guide 51. Each of the interrupters 21 and 22 is arranged on the different side from each corresponding dog between a right side and a left one. As a result, the movable mirrors 36 and 37 can be moved an approximate half of a distance between a pair of fixed mirrors 34 and 35 in right and left directions, respectively.

That is, a movable distance of the movable mirrors 36 and 37 can be obtained reasonably. Therefore, a wavelength measurement range can be obtained widely. The accuracy of a wavelength measurement can be improved.

Further, because a position sensor comprising the dogs 11 and 12 and the interrupters 21 and 22 is disposed on one side surface of the movable mirrors 36 and 37, which is on the beam splitter 33 side, and is disposed in a triangle formed by the driving pulley 62 and the driven pulleys 63 and 64, the block 50 can be compacted. The casing 40 can be small.

In addition to the above example of the arrangement of the dogs 11 and 12, the dogs 11 and 12 may be arranged on one side surface of the movable mirrors 36 and 37 in different positions from each other at least in a direction along the moving direction of the movable mirrors and in a direction crossing the moving direction.

That is, two dogs 11 and 12 are provided on one side surface of the movable mirrors 36 and 37 with respect to a moving direction thereof. The dog 11 is not arranged on a line parallel to the moving direction of the movable mirrors 36 and 37, on which the dog 12 is disposed. Further, the dog 11 is not arranged on a line perpendicular to the moving direction of the movable mirrors 36 and 37, on which the dog 12 is disposed.

The interrupter 21 corresponding to the dog 11 is arranged so that when the interrupter 21 detects the dog 11 by moving the movable mirrors 36 and 37 in a left direction, the dog 12 is moved in the left direction beyond the interrupter 21 as shown in FIG. 6A.

The interrupter 22 corresponding to the dog 12 is arranged so that when the interrupter 22 detects the dog 12 by moving the movable mirrors 36 and 37 in a right direction, the dog 11 is moved in the right direction beyond the interrupter 22 as shown in FIG. 6B.

Although in the above-described embodiment, the He-Ne laser light is a reference light, the reference light is not limited to this. Another laser light may be used.

Although the position sensor is applied to the optical interferometer in the embodiment, the position sensor can be widely applied to any other devices.

Although a position of a movable body which moves straightly is detected in the embodiment, it is possible to detect a position of a movable body which moves along a curved line.

Although the position sensor is a photoelectric type of position sensor in the embodiment, the position sensor may be a magnetic type of position sensor, an electronic type of position sensor or a mechanical type of position sensor.

Further, the movable body may be designated optionally. The number of pairs of the portion to be detected and the detector may be not less than 3. Needless to say, any other concrete detail constructions may be suitably changed.

As described above, according to the present invention, the movable body can be moved a long distance, for example, from each portion to be detected of the movable body in a neutral position to each corresponding detector. By detecting a plurality of portions to be detected, which are provided on one side surface of the movable body in different positions from each other in a direction along the moving direction and in a direction crossing the moving direction, with the corresponding detectors, the movable distance of the movable body can be obtained reasonably. Because a plurality of portions to be detected and a plurality of detectors are arranged on one side of the movable body with respect to the moving direction of the movable body, a casing for containing the movable body can be small.

Further, because the amount of movement of the movable body in a reciprocal direction can be detected by a photoelectric sensing method in which the dogs are not in contact with the detectors, the above-described effect can be obtained.

According to the present invention, because the movable optical part can be moved a long distance along an optical axis which is approximately parallel to the optical axis of the reference light, the wavelength of a light can be measured more precisely. Further, the casing can be sufficiently small. Because the position of the movable optical part is detected by using the above position sensor, the movable distance of the movable optical part can be obtained reasonably, even though the casing is small.

According to the present invention, because the movable reflecting member can be moved a long distance along an optical axis which is approximately parallel to the optical axis of the reference light, the wavelength of a light can be measured more precisely. Further, the casing can be sufficiently small. Because the position of the movable reflecting member is detected by using the above position sensor, the movable distance of the movable reflecting member can be obtained reasonably. It can be achieved even though the casing is small.

Further, because the pair of movable reflecting members is moved between the pair of fixed reflecting members on an optical axis which is approximately parallel to the optical axis of the reference light so as to reflect each light totally, a wide range in which an optical path difference between two lights is caused can be obtained.

The entire disclosure of Japanese Patent Application No. Tokugan-Hei 11-86737 filed on Mar. 29, 1999 including specification, claims drawings and summary are incorporated herein by reference in its entirety.

What is claimed is:

1. A position sensor for detecting two movement limiting positions of a movable body that reciprocates, the position sensor comprising:

two detectors for detecting two corresponding portions provided on one surface of the movable body, wherein a first of the two detectors is disposed so as to detect a first of the two corresponding portions when the movable body is positioned in one of the two movement limiting positions and a second of the two detectors is disposed so as to detect a second of the two corresponding portions when the movable body is positioned in an other of the two movement limiting positions;

wherein the two corresponding portions are disposed on a line which is not parallel to nor perpendicular to a moving direction of the movable body;

wherein the first of the two detectors for detecting the first of the two corresponding portions is disposed so that when the first detector detects the first corresponding portion during movement of the movable body in a first direction, the second of the two corresponding portions is positioned so as to move the second of the two corresponding portions in the first direction beyond the first detector; and wherein the second detector for detecting the second corresponding portion is disposed so that when the second detector detects the second corresponding portion during movement of the movable body in a second direction, opposite the first direction, the first corresponding portion is positioned so as to move the first corresponding portion in the second direction beyond the second detector.

2. The position sensor as claimed in claim 1, wherein the two corresponding portions are a pair of dogs projecting from the movable body, and the two detectors are each photoelectric detectors.

3. An optical interferometer comprising:

a casing;

a plurality of optical parts for branching an input light into two branched lights, for causing a path difference between the two branched lights and for interfering one branched light with the other branched light by recombining the two branched lights, the plurality of optical parts comprising a movable optical part which is movable with respect to the casing;

a movable body that reciprocates in order to reciprocate the movable optical part; and the position sensor as claimed in claim 1.

4. An optical interferometer comprising:

a casing;

a beam splitter for branching each of a reference light and a light to be measured into two optical paths for a transmitted light and a reflected light, which are perpendicular to each other, and for recombining the reflected light and the transmitted light to obtain a recombined light;

a plurality of reflecting members for reflecting the reflected light and the transmitted light so as to cause a path difference between the reflected light and the transmitted light, the plurality of reflecting members comprising a movable reflecting member which is movable with respect to the casing;

a photo-detector for receiving the recombined light in order to obtain an interference fringe of the reference light and an interference fringe of the light to be measured;

a movable body that reciprocates in order to reciprocate the movable reflecting member; and the position sensor as claimed in claim 1.

5. The optical interferometer as claimed in claim 4 further comprising:

a pair of fixed reflecting members in the casing for reflecting the reflected light and the transmitted light toward each other and a pair of movable reflecting members in the casing for totally reflecting a light toward each of the pair of fixed reflecting members, the pair of movable reflecting members being disposed between the pair of fixed reflecting members.

* * * * *